United States Patent
Summerer

(10) Patent No.: US 7,108,811 B2
(45) Date of Patent: Sep. 19, 2006

(54) PROCESS AND DEVICE FOR PRODUCING MOULDED PARTS FROM PLASTIC

(76) Inventor: Franz Josef Summerer, Gansbach 29, D-83253 Rimsting (DE)

(*) Notice: Subject to any disclaimer, the term of this patent is extended or adjusted under 35 U.S.C. 154(b) by 324 days.

(21) Appl. No.: 10/759,533

(22) Filed: Jan. 20, 2004

(65) Prior Publication Data

US 2004/0169296 A1    Sep. 2, 2004

(30) Foreign Application Priority Data

Jan. 21, 2003    (DE) ............... 103 02 102

(51) Int. Cl.
*B29C 45/04* (2006.01)
*B29C 45/14* (2006.01)
*B29C 45/64* (2006.01)

(52) U.S. Cl. ............ 264/1.7; 264/2.2; 264/40.5; 264/328.7; 425/451

(58) Field of Classification Search .......... 264/1.7, 264/2.2, 328.7
See application file for complete search history.

(56) References Cited

U.S. PATENT DOCUMENTS

| | | | | |
|---|---|---|---|---|
| 3,577,591 A | * | 5/1971 | Ricards et al. ............ | 425/171 |
| 4,360,335 A | * | 11/1982 | West ............ | 425/450.1 |
| 5,306,136 A | * | 4/1994 | Oomori et al. ............ | 425/593 |
| 5,658,522 A | * | 8/1997 | Fischer ............ | 264/328.7 |
| 6,402,497 B1 | * | 6/2002 | Banjyo et al. ............ | 425/173 |
| 6,638,046 B1 | * | 10/2003 | Gillen et al. ............ | 425/117 |
| 2003/0137066 A1 | * | 7/2003 | Summerer ............ | 264/2.5 |

FOREIGN PATENT DOCUMENTS

| | | |
|---|---|---|
| DE | 195 17 024 C1 | 6/1996 |
| DE | 101 15 647 A1 | 10/2002 |
| EP | 0 696 954 B1 | 2/1996 |

* cited by examiner

*Primary Examiner*—Michael P. Colaianni
*Assistant Examiner*—Monica A Huson

(57) ABSTRACT

In a process for producing, in particular, optical moulded parts from plastic, a first mould plate (1') is moved in the direction of the second mould plate (2') until the mould plates (1', 2') make contact at stop faces (9, 10). Subsequently, the first mould plate (1') approaches the second mould plate (2') through a tilting movement. In this case, plastic is injected into the cavity (15) which is formed between the first mould plate (1') and a second mould plate (2'). Shortly before termination of the clamping movement, the two mould plates are caused to be released from one another in the region of the stop faces (9, 10). The two mould plates are then clamped in parallel.

8 Claims, 5 Drawing Sheets

PROCESS AND DEVICE FOR PRODUCING MOULDED PARTS FROM PLASTIC

Figure 1:
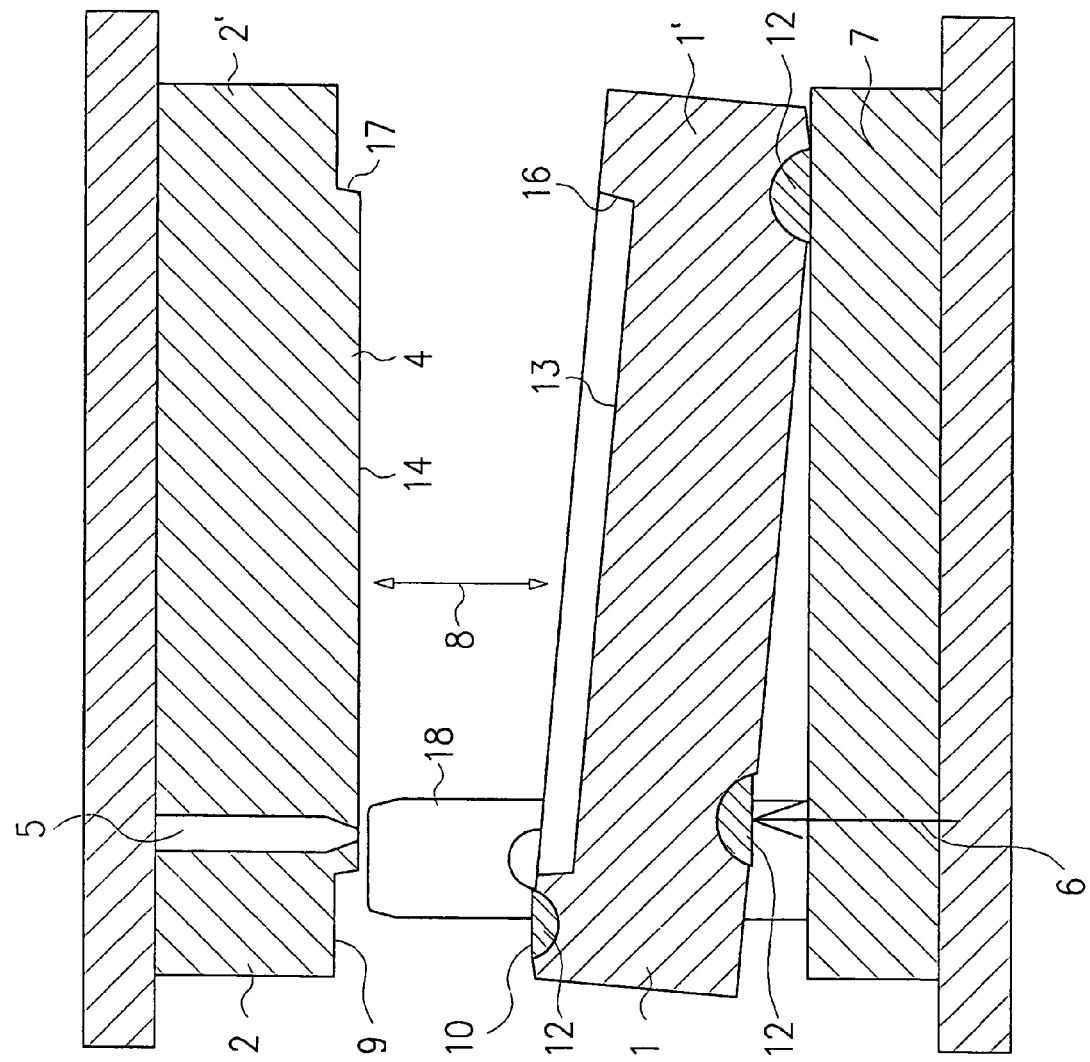

The invention relates to a device and a process for producing moulded parts, in particular large-area optical moulded parts, from plastic.

In order to produce plastic moulded parts, use has been made so far of the injection moulding and embossing processes known in plastics processing. However, the known processes have substantial disadvantages in the case, in particular, of large-area moulded parts. Because of the normally short runners in the injection moulding process, it is necessary to expend a high injection pressure in producing large-area moulded parts. However, this leads to high stresses and thus to warpage in the moulded part in the case of conventional injection moulding processes. Moreover, strong sinking occurs in the subregion of the moulded part remote from the gate. Conventional injection moulding processes are therefore not suitable for producing large-area moulded parts.

Furthermore, there are known in injection moulding technology embossing processes in which the moulding compound is injected into a previously enlarged cavity and subsequently pressed in the thickness direction accompanied by the execution of a mould movement. However, in the case of the use of the known embossing process with parallel plate guidance, the moulded parts frequently have faults at the surface which are to be ascribed to frontal flow. Consequently, this process also does not permit the production of large-area moulded parts of acceptable quality.

Completely transparent optical moulded parts such as glazings for motor vehicles, for example, have been produced from glass as a rule, for a long time. Because of their lesser weight, the higher impact strength and the increased design freedom, optical plastic moulded parts have acquired increasing importance in the recent past. Because of the increased demands with respect to freedom from stress and surface quality, there are particular difficulties relating to the production of acceptable optical moulded parts.

Document DE 101 15 647 A1 describes an embossing process in which work is carried out with mould plates which can be tilted relative to one another. This process permits shrinkage compensation in the case of moulded parts with a wedge-shaped or stepped cross section. In this case, the mould plates are also at an angle other than 0 in the closed position.

It is the object of the invention to develop a process and a device for producing a moulded part from plastic which avoids the production of strong stresses in the moulded part and ensures a high surface quality. In particular, the aim is to be able to produce large-area moulded parts and/or optical moulded parts such as, for example, glazings of motor vehicles, which must satisfy very high optical demands because of their relevance to safety.

This object is achieved by means of a process and a device in accordance with the features of the independent claims. Advantageous refinements of the invention are laid down in the subclaims.

An inventive process for producing moulded parts from plastic by means of a device having a first and a second mould plate comprises the following process steps. In order to clamp the device, the first mould plate is moved in the direction of the second mould plate until the mould plates make contact at stop faces. Subsequently, the first mould plate approaches the second mould plate through a tilting movement. Before and/or during the tilting movement, plastic is injected into a cavity which is formed between the first mould plate and the second mould plate. Shortly before termination of the clamping movement, it is ensured that the two mould plates are released from one another in the region of the stop faces. In the last step, the two mould plates are clamped in a substantially parallel fashion.

The distribution of the moulding compound inside the cavity is strongly supported by the initially executed tilting movement of the first mould plate. Despite long runners, it is possible in this way to set a relatively low injection pressure such that only very slight stresses occur in the moulded part. Frontal flow is additionally prevented by this embossing process started during or, if appropriate, also after the injection phase. Shortly before termination of the clamping movement, however, the tilting movement is discontinued according to the invention and changed into a movement of the plates parallel to one another. Particularly low and uniform stresses and good surface qualities of the moulded part are obtained by the dwell pressure phase which takes place in the parallel position of the mould plates. It is assumed that this is to be ascribed to the fact that given a parallel position of the mould plates in the dwell pressure phase, a more uniform pressure distribution in the cavity is rendered possible than would be the case with a tilting embossing movement conducted to the end. Tests revealed that in the case of a tilting movement conducted to the end in the region near the stop faces the geometry has the effect that an inadequate embossing effect is exerted by the mould plates, as a result of which surface faults occurred precisely in the region near the gate. As a result of the solution according to the invention, a dwell pressure which is uniform over the extent of the moulded part is achieved with a uniform embossing path, and so it is possible, in particular, to prevent stresses and surface faults in the region near the stop faces. The said advantages are of great practical importance for the quality of optical moulded parts.

The release of the two mould plates from one another is preferably achieved by reducing a force which holds the two mould plates together during the tilting movement at the stop faces.

The tilting movement is preferably not changed into the parallel movement until shortly before the completely clamped state of the mould plates. Consequently, one advantageous variant of the process according to the invention is characterized in that the residual clamping path over which the release of the stop faces from one another is performed is less than or equal to 1 mm.

Preferably, after the release of the mould plates the first mould plate is shifted in the direction away from the second mould plate in a defined movement which is determined by virtue of the fact that an axis of rotation of the first mould plate is mounted in an axial guide displaceably in the normal direction to the second mould plate and at the same time rotatably. As a result of the translatory support, a defined positioning of the first mould plate can be ensured even after the release of the two mould plates from one another.

A further advantageous variant of the process according to the invention is characterized in that no plastic is pressed back into the cavity during parallel clamping of the mould plates (that is to say after the instant at which the mould plates are opposite one another in parallel position). In this case, the dwell pressure equalizing the shrinkage of the moulded part is accomplished during the parallel embossing solely by the embossing operation (and not by further feeding of plastic).

A device according to the invention comprises a means for exerting a force which, in the event of a clamping movement for which the first mould plate is tilted in the direction of the second mould plate, holds the two mould plates together at the stop faces. Furthermore, the device comprises a control means which causes two mould plates to be released from one another shortly before termination of the clamping movement in the region of the stop faces.

Figure 2:
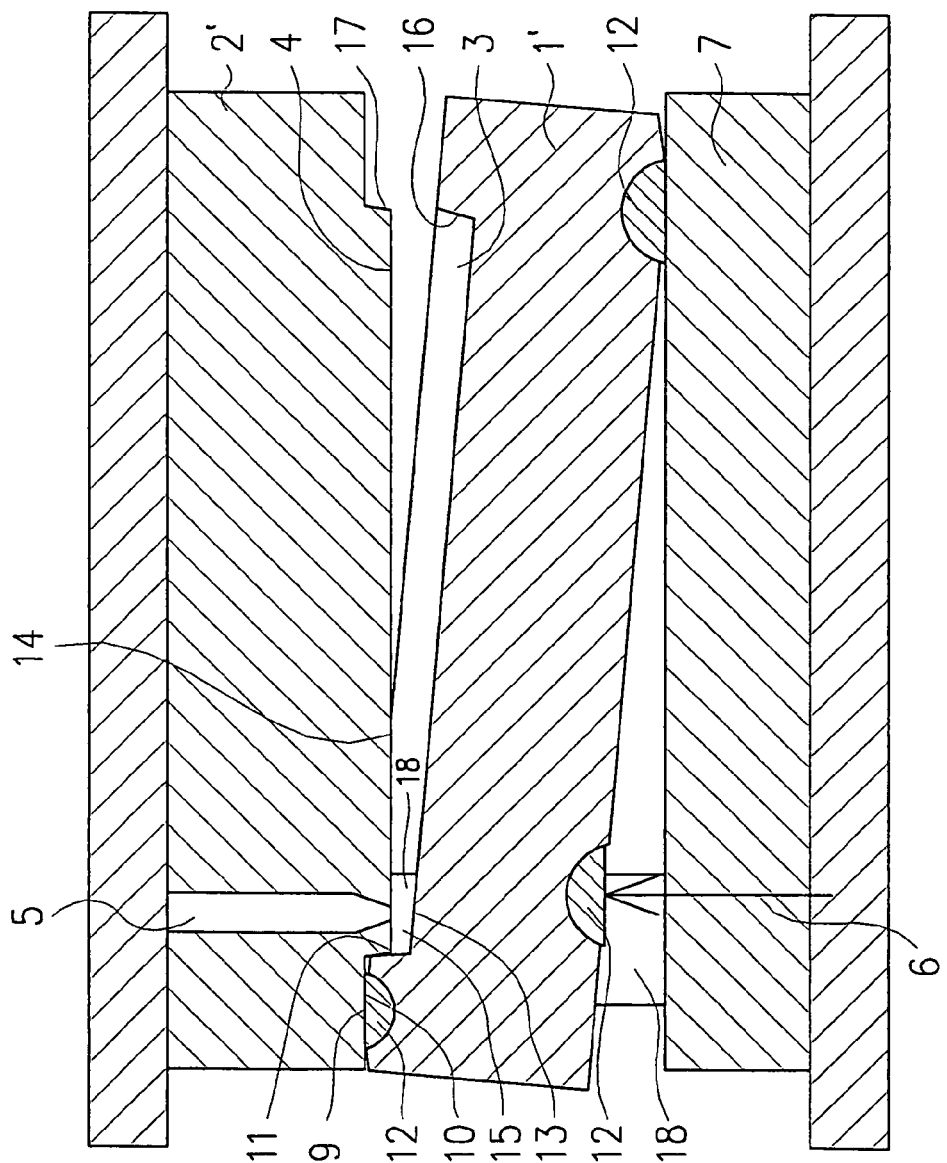
Figure 3:
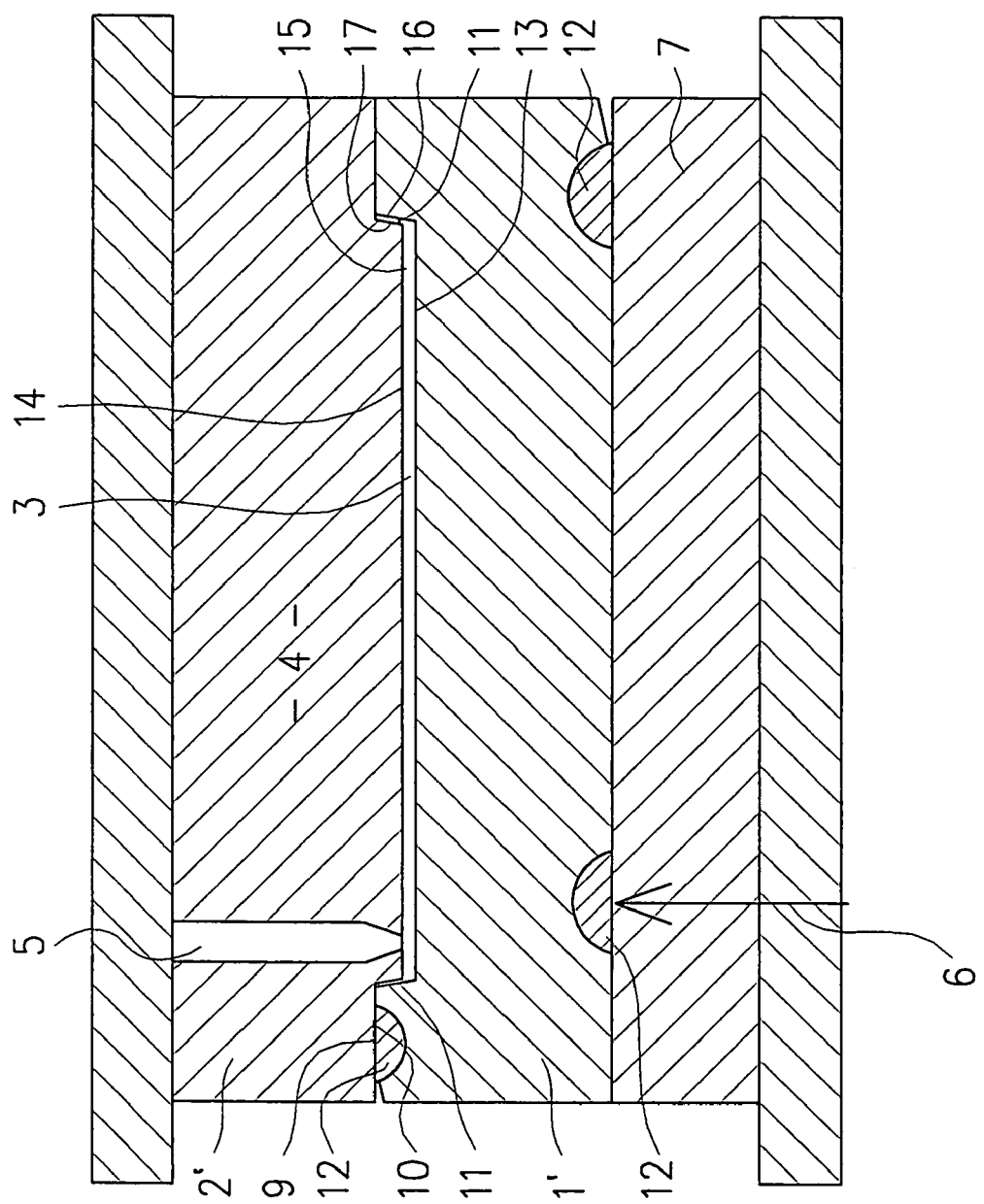
Figure 4:
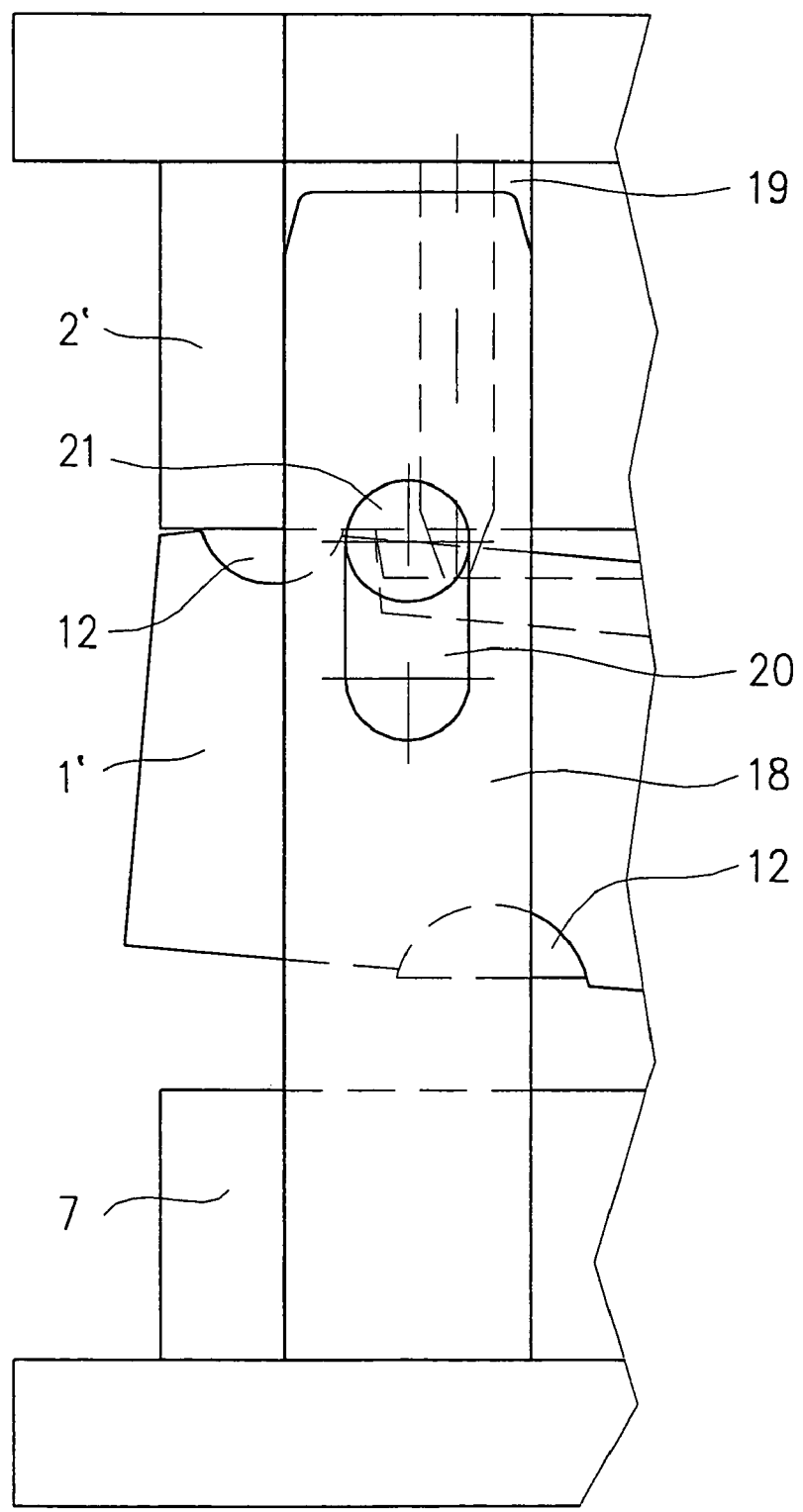
Figure 5:
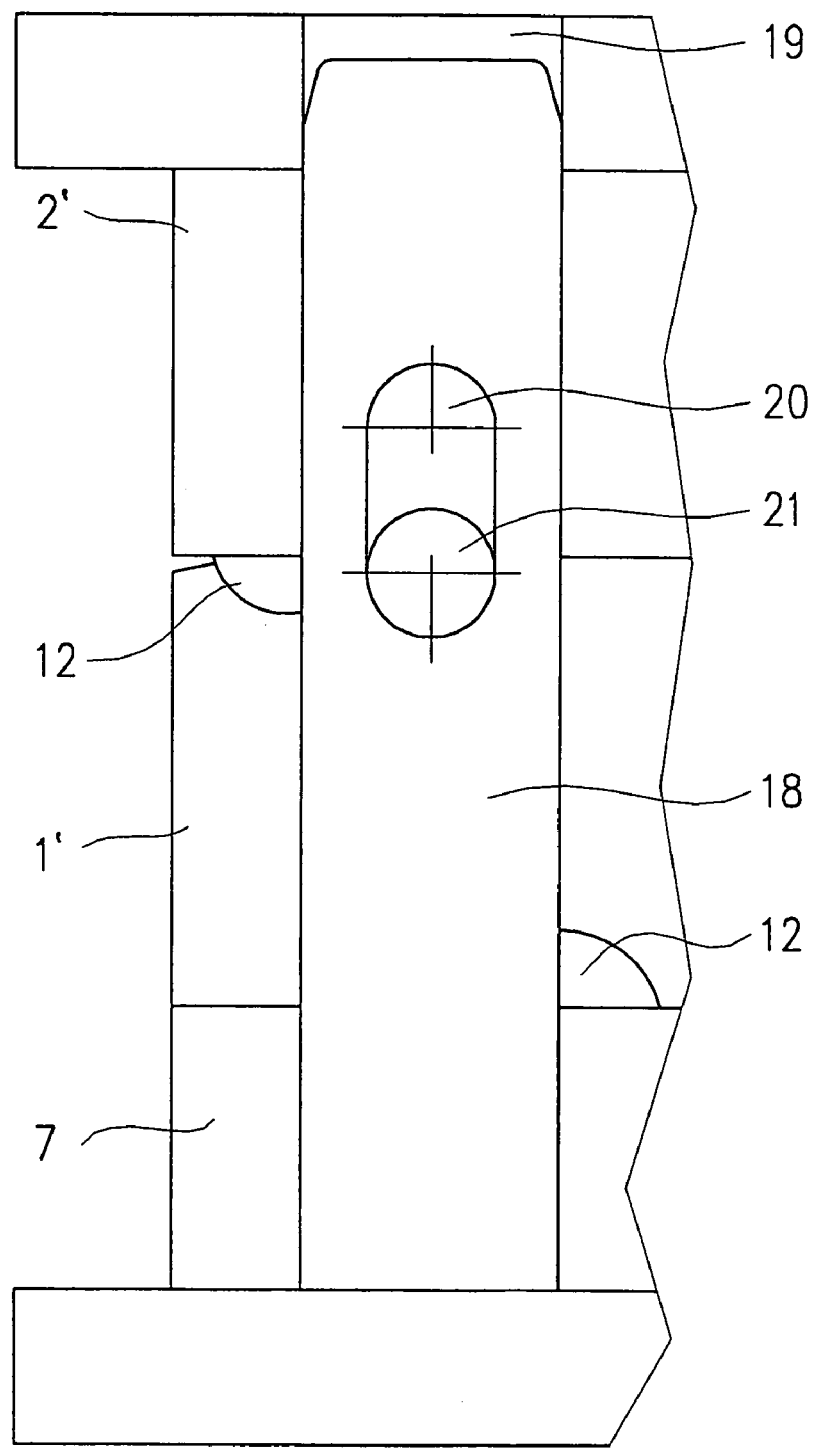

An exemplary embodiment of the invention is explained below with the aid of the drawings, in which:

FIG. 1 shows a schematic sectional illustration in the region of the mould core of a device according to the invention for producing optical moulded parts from plastic, in the open state before the beginning of the production process, FIG. 2 shows a sectional illustration of the device in accordance with FIG. 1 in a stage of the process when the two mould plates just make contact, FIG. 3 shows a sectional illustration of the device in accordance with FIG. 1 after the end of the clamping movement, FIG. 4 shows a schematic illustration of the device in accordance with FIG. 1 in the region of the axial guide when the two mould plates just make contact, and FIG. 5 shows a schematic illustration of the device in accordance with FIG. 1 in the region of the axial guide after the end of the clamping movement.

A device (FIG. 1) according to the invention has a first mould plate 1' and a second mould plate 2', the second mould plate 2' being of fixed, that is to say stationary design in a preferred exemplary embodiment. In the figures, the first mould plate 1' is always designed as a cavity mould plate 1, and the second mould plate 2' is always designed as a mould core plate 2. However, the first mould plate 1' can also be designed as a mould core plate, and the second mould plate 2' can consequently be designed as a cavity mould plate. A cutout 3 with a prescribed largely three-dimensional shape is provided in the cavity mould plate 1. At its front end, the mould core plate 2 has a mould core 4 whose external shape is adapted to the shape of the cutout 3. The mould core 4 can be designed both in one piece with the mould core plate 2, and as an independent, preferably exchangeable mould part. A plastics feed unit 5, for example in the form of a hot runner directly adjoining the article to be produced, is provided in the edge region of the mould core 4 in the second mould plate 2', thus in the mould core plate 2 in accordance with FIG. 1. However, the plastics feed unit 5 can also equally be provided in the movable mould plate 1'. If the second mould plate 2' is designed as a cavity mould plate, the plastics feed unit is consequently advantageously provided in the edge region of the cutout 3.

In the open state, which is illustrated in FIG. 1, the first mould plate 1' is inclined by an angle, for example in the range from 0° to 30°, to the second mould plate 2'. This inclination is effected, for example, by virtue of the fact that the first mould plate 1' is rotatably mounted and has an erecting force produced mechanically, hydraulically, pneumatically or by spring applied to it on the side situated opposite the plastics feed unit 5. This erecting force is indicated by a force arrow 6 in the figure. The first mould plate 1' lies on a base plate 7 on the side remote from the point of action of the erecting force. In the open state of the device, the first mould plate 1' is thereby inclined to the second mould plate 2' in such a way that the spacing between the mould plates 1' and 2', that is to say between the cavity mould plate 1 and the mould core plate 2, is least in that edge region of the mould core 4 or of the cutout 3 in which the plastics feed unit 5 is arranged. The second mould plate 2' and the base plate 7 are always largely parallel to one another during the entire production process.

The base plate 7 can be moved relative to the second mould plate 2' together with the first mould plate 1' in the direction of the arrow 8. In FIG. 2, the device according to the invention is shown in a stage of the process when a stop face 9 on the mould core side which borders immediately on the mould core 4 of the mould core plate 2 has made contact with a stop face 10 on the cavity side that borders immediately on the cutout 3 of the cavity mould plate 1. A further movement of the base plate 7 in the direction of the second mould plate 2' then leads to a tilting movement of the first mould plate 1'. A precondition for this is that the compressive force of the base plate 7 is greater than the erecting force that acts on the first mould plate 1'. By appropriate structural configuration of the device (compare FIGS. 4 and 5), the axis of rotation for the tilting movement of the first mould plate 1' is advantageously fixed in the region of a vertical flash face gap 11 near the gate—said gap will be explained more precisely further below.

However, the axis of rotation can also alternatively be fixed in the region of the vertical flash face gap 11 remote from the gate. The terms near the gate and remote from the gate always relate to the distance from the plastics feed unit 5.

In order for the compressive forces which occur per se at points to be distributed over surfaces during the tilting movement, and in order to avoid lateral forces, it is advantageous to provide balancing elements 12 in the regions of the first mould plate 1' to which pressure is applied. In the simplest case, these balancing elements 12 are designed as spherical sections that are mounted rotatably in corresponding cutouts in the first mould plate 1'. As an alternative to this, the spherical sections can, however, also be fastened at the corresponding points of the second mould plate 2', the base plate 7 and, for example, the hydraulic punch in order to apply the erecting force 6, and in each case dip into a cutout in the first mould plate 1'. In a simplified embodiment, it is also possible to dispense with the balancing elements 12. Instead of this, the regions of the first mould plate 1' and of the hydraulic punch to which pressure is applied are designed convexly on the outside. The surface pressure is also reduced thereby during the embossing operation, and thus the setting time is somewhat lengthened.

In the completely clamped state, illustrated in FIG. 3, as well, a bounding wall 13 of the cutout 3 has a predetermined spacing from an outer bounding wall 14 of the mould core 4, the result being formation of a cavity 15. The shape of the cavity 15 determines the shape of the end product to be produced by means of an injection operation. Adjoining the cavity 15 is the vertical flash face gap 11 which is bounded by a vertical flash face 16 on the cavity plate side and a vertical flash face 17 on the core plate side. The vertical flash face keeps the moulding compound from exiting via the cavity 15. A specific vertical flash face gap 11 can also balance out manufacturing tolerances. Again, on the side remote from the gate, for example, the vertical flash face gap 11 permits a specific overspraying as a function of a pressure-relief valve. The gap width of the vertical flash face gap 11 is, for example 0.01 mm to 0.1 mm. Gap widths of up to several millimeters are also conceivable given specific overspraying.

Provided on the base plate 7 are axial guides 18 that either are designed in one piece with the base plate 7, or are fastened on the base plate 7 (FIG. 4). For reasons of simplification, only one axial guide is illustrated in FIG. 4, but a plurality of axial guides, normally two, are advantageously provided. The axial guide 18 extends in the direction of movement 8 (normal direction to the fixed mould plate 2') and is configured in such a way that during a clamping operation of the device it dips into a guiding cutout 19 in the second mould plate 2' and thereby ensures exact centring and guidance of the two mould plates relative to one another—such a guide is also denoted as a land guide in the specialist jargon. The contours, invisible per se, of the plastics feed unit 5 situated in the inner region of the device, in particular in the region of the mould core 4, and of the cavity 15 are illustrated by dashes in FIG. 4.

Provided in the axial guide 18, preferably in the form of a longitudinal through-hole, is a shaft holding region 20 in which a shaft 21 is guided. The shaft 21 is preferably rigidly connected to the first mould plate 1'. The central axis of the shaft 21 is simultaneously the axis of rotation of the tilting movement of the first mould plate 1'. Depending on the tilting movement of the first mould plate 1', the shaft 21 is moved with an increasing degree of clamping of the device from the end, remote from the base plate 7, of the shaft holding region 20 (compare FIG. 4) to the end, near the base plate 7, of the shaft holding region 20 (compare FIG. 5). The axial guide 18 thus effects both a rotary bearing of the first mode plate 1' and a guidance of the first mould plate 1' in the direction of movement 8. Another possibility consists in guiding the shaft 21 displaceably, but in a fashion fixed against rotation, in the shaft holding region 20 of the axial guide, it then being necessary for the first mould plate 1' to be mounted such that it can rotate about the shaft 21 fixed against rotation. Furthermore, the stop face 10 need not be realized directly at the first mould plate 1', but can also be formed by a front-side surface section, running laterally outside the cutout 3, of the shaft 21 bearing the first mould plate 1'. In this case, the mould plate 2' has as mating stop face 9 a depression of complementary configuration into which the shaft 21 enters partly during the operation of the equipment.

The production of a plastic moulded part by means of the device according to the invention is explained below in more detail:

In the open state, the mould core 4 is firstly located outside the cutout 3 on the cavity plate side. The base plate 7 is now moved together with the first mould plate 1' in the direction of the second mould plate 2'. As soon as the stop faces 9 and 10 of the mould core plate 2 and the cavity mould plate 1, respectively, make contact, plastic is injected into the cavity 15 that forms via the plastics feed unit 5. The injection operation can also be begun within a prescribed time interval, for example 2 seconds before or after the contact, or when a prescribed spacing, for example 2 mm, of the stop faces 9 and 10 is reached. The only decisive thing is that the plastic is reliably prevented from escaping from the cavity 15.

While the plastic is being injected into the cavity 15, the base plate 7 is further moved, together with the first mould plate 1', in the direction of the second mould plate 2'. On the basis of the resistance of the second mould plate 2', the movement of the base plate 7 together with the first mould plate 1' effects a tilting movement of the first mould plate 1' such that the angle of inclination of the first mould plate 1' to the second mould plate 2' decreases continuously with an increasing degree of clamping of the device. The plastic flowing in is distributed, supported by the tilting movement of the first mould plate 1, from the region of the plastics feed unit 5 in the direction of the edge region, remote therefrom, of the cavity 15 which is being formed. It is also conceivable for the injection operation to be performed at least substantially before the beginning of the tilting movement, that is to say for at least a major part of the moulding compound to be injected into the cavity 15 as early as the beginning of the tilting movement.

The erecting force 6 is reduced shortly before termination of the clamping movement (for example given a remaining clamping path of 1 mm in the region of the mould plates 1', 2' remote from the gate). As soon as the opening force effected by the injection pressure inside the cavity exceeds the erecting force 6, the two stop faces 9 and 10 are released from one another. The mould plate 2' accomplishes a return tilting movement and in so doing places the whole area of its rear side onto the front side of the base plate 7. The return tilting movement is performed by a translation of the shaft 21 in the shaft holding region 20, a rotation of the central axis of the shaft 21 taking place at the same time. The two mould plates 1' and 2' are situated opposite one another in a substantially parallel fashion at the end of the return tilting movement. The axial guide 18 in this case absorbs the strong forces occurring during the return tilting movement, and ensures that the requirements with regard to the maximum tolerance of the vertical flash face gap during subsequent parallel embossing are met.

The last phase of the clamping movement is an embossing phase accompanied by parallel positioning of the two mould plates 1' and 2'. For this purpose, the base plate 7 is moved together with the first mould plate 1' over the residual path (1 mm or less) in the direction of the second mould plate 2'. In the completely clamped state, the two mould plates 1' and 2' are situated opposite one another, likewise in a largely parallel fashion. During the parallel embossing operation, or at least in a concluding phase of the same, it is preferred for no more plastic to be injected into the cavity 15. In conjunction with the parallel plate positioning, this prevents the occurrence of a non-varying dwell pressure profile over the moulded part.

It is essential to the invention that the embossing movement of the mould is executed in at least two movement phases—a tilting embossing phase and a later parallel embossing phase.

The erecting force 6 can be produced, for example, by a piston/cylinder arrangement (not illustrated) in the base plate 7. The control of the cylinder pressure, and thus of the erecting force 6, is performed via a conventional pressure control unit which permits the erecting force 6 to be reduced in order to bring the mould plates 1' and 2' out of contact at the correct moment. The instant of pressure lowering can take place, for example, by a measurement of the path of movement of the base plate 7, or by monitoring the path of movement of the mould plate 2' in the region remote from the gate. Furthermore, it is also possible to bring about the return tilting movement by other mechanical control means. For example, it is possible to effect the return tilting movement not by reducing the erecting force, but by increasing the opening force as a consequence of increasing the pressure in the cavity 15 by control of the plastics feed.

In addition, a "breathing phase" can be provided in the course of the return tilting movement, that is to say between the tilting embossing phase and the parallel embossing phase.

As already mentioned, the stop faces 9, 10 are released from one another when the opening force occurring as a consequence of the injection pressure exceeds the erecting force 6 which compresses the mould in the region of the stop faces 9, 10. The return tilting movement begins at this moment. Owing to the returning shift of the tiltable mould plate 1', a lowering of pressure is set up in the enlarging cavity 15, as a result of which the first mould plate 1' comes to rest in an intermediate position determined by a force equilibrium, assuming an erecting force 6 which is held substantially constant. The position of the free mould plate 1', that is to say the one already released from the stop face 9 but not yet bearing against the base plate 7 in the region near the gate, can be influenced at this stage by relatively slight variations in the injection pressure or in the erecting force 6. If the filling of the cavity 15 has not yet been terminated at this point in time, the pressure fluctuations occurring during filling of the cavity 15 suffice for the occurrence of changes in position of the first mould plate 1'. The self-explanatory term of "mould breathing" is used.

The mould breathing reduces undesired pressure peaks when filling the cavity 15. By targeted adaptation of the erecting force 6 to the opening force effected by the injection pressure, and of a subsequent slow increase in the injection pressure or lowering of the erection force 6, it is possible to open the mould in a quasi-static equilibrium process accompanied by mould breathing. A particularly uniform filling cycle of the cavity 15 is thereby achieved still during the return tilting movement.

After the end of the clamping operation and a certain solidification of the plastic, the device is opened again and the finished moulded part is removed from the device by means of an ejecting device (not shown).

The invention can also be used with particular advantage to produce moulded parts with a backsprayed surface material. The production of such multicomponent moulded parts differs from the process described so far only in that before the clamping of the mould plates 1', 2' a surface material (for example a transparent film in the case of optical moulded parts, or a fabric (leather, material, etc.) to be backsprayed in the case of non-transparent moulded parts) is inserted into the cavity mould plate 1'. This technique, which is known per se, combines very advantageously with the process according to the invention since, firstly, owing to the tilting operation any air entrapments between the surface material and the moulding compound can be very effectively displaced and pushed out at the end of the mould plate remote from the gate—something which offers a substantial process advantage particularly in the case of the production of large-area moulded parts—and, secondly, owing to the concluding parallel embossing operation it is possible to use comparatively low pressures, and therefore to achieve kind handling of the surface material accompanied by a comparatively low risk of damage.

The invention claimed is:

1. A process for producing moulded parts from plastic by means of a device having a first and a second mould plate, the process comprising:
    clamping the device in such a way that the first mould plate is moved in the direction of the second mould plate until the mould plates make contact at stop faces;
    further clamping the device in such a way that the first mould plate approaches the second mould plate through a tilting movement;
    injecting plastic into the cavity which is formed between the first mould plate and the second mould plate before and/or during the tilting movement;
    causing the two mould plates to be released from one another in the region of the stop faces shortly before termination of the clamping movement; and
    parallel clamping of the two mould plates.

2. The process according to claim 1, wherein shortly before termination of the clamping movement a force is reduced which holds the two mould plates together at the stop faces during the tilting movement.

3. The process according to claim 1 or 2, wherein the release of the stop faces is performed in conjunction with a remaining clamping path of less than 1 mm.

4. The process according to claim 1 or 2, wherein after the release of the mould plates the first mould plate is shifted in the direction away from the second mould plate in a defined movement which is determined by virtue of the fact that an axis of rotation of the first mould plate is mounted in an axial guide displaceably in the normal direction to the second mould plate and at the same time rotatably.

5. The process according to claim 1 or 2, wherein the transition from the tilted position of the first mould plates into the parallel position of the mould plates is carried out by means of targeted control of a force compressing the two mould plates, or of the injection pressure accompanied by mould breathing.

6. The process according to claim 1 or 2, wherein no plastic is pressed back into the cavity during parallel clamping of the mould plates.

7. The process according to claim 1 or 2, wherein the moulded part is an optical moulded part.

8. The process according to claim 1 or 2, wherein the moulded part is a multi-component mould part which has a surface material, in particular film or fabric, onto which the moulded part is moulded.

* * * * *